(12) United States Patent
Gottmann (10) Patent No.: US 8,097,378 B2
(45) Date of Patent: Jan. 17, 2012

(54) STACK SEAL INTERFACE ADAPTER

(75) Inventor: Matthias Gottmann, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 476 days.

(21) Appl. No.: 12/402,423

(22) Filed: Mar. 11, 2009

(65) Prior Publication Data

US 2010/0233565 A1 Sep. 16, 2010

(51) Int. Cl.
*H01M 2/38* (2006.01)
*H01M 2/40* (2006.01)
*H01M 8/24* (2006.01)

(52) U.S. Cl. ........................ 429/458; 429/471

(58) Field of Classification Search .................. 429/458, 429/468, 471, 459, 460, 423, 469
See application file for complete search history.

(56) References Cited

U.S. PATENT DOCUMENTS

| | | | |
|---|---|---|---|
| 6,358,641 B1 * | 3/2002 | Mease | 429/470 |
| 6,455,179 B1 * | 9/2002 | Sugita et al. | 429/471 |
| 6,500,579 B1 * | 12/2002 | Maeda et al. | 429/454 |
| 6,777,126 B1 | 8/2004 | Allen | |
| 6,803,136 B2 | 10/2004 | Ong et al. | |
| 6,945,266 B2 | 9/2005 | De Tezanos Pinto | |
| 7,384,703 B2 * | 6/2008 | Sato et al. | 429/434 |
| 7,659,022 B2 * | 2/2010 | Valensa et al. | 429/411 |
| 2006/0204827 A1 | 9/2006 | Hickey et al. | |
| 2007/0196704 A1 | 8/2007 | Valensa et al. | |
| 2007/0202385 A1 * | 8/2007 | Minamiura et al. | 429/38 |
| 2008/0038600 A1 * | 2/2008 | Valensa et al. | 429/20 |
| 2008/0038622 A1 * | 2/2008 | Valensa et al. | 429/38 |
| 2008/0193825 A1 | 8/2008 | Nguyen et al. | |
| 2009/0186244 A1 * | 7/2009 | Mayer | 429/2 |
| 2010/0124685 A1 * | 5/2010 | Valensa et al. | 429/26 |
| 2011/0059380 A1 * | 3/2011 | Matsumoto et al. | 429/437 |

FOREIGN PATENT DOCUMENTS

| | | |
|---|---|---|
| KR | 10-2006-0019998 A | 3/2006 |
| WO | WO 2004/102706 A2 | 11/2004 |

* cited by examiner

*Primary Examiner* — Hae Moon Hyeon
(74) *Attorney, Agent, or Firm* — The Marbury Law Group, PLLC (57) ABSTRACT

A fuel cell system comprises a first fuel cell stack having a first end plate, wherein the first end plate has a first opening, and a fuel cell component having a second opening. An adapter connects the first opening in the first end plate and the second opening in the fuel cell component. The adapter comprises a hollow tube. At least one of the first and second openings is located in a first groove. At least a first portion of the adapter is located in the first groove such that there is a passage from the first opening to the second opening through an interior of the hollow tube.

19 Claims, 8 Drawing Sheets

STACK SEAL INTERFACE ADAPTER

BACKGROUND OF THE INVENTION

The present invention relates generally to the field of fuel cells and more specifically to a sealing mechanism between a fuel cell stack and an adjacent fuel cell component.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation. In a high temperature fuel cell unit such as a solid oxide fuel cell (SOFC) unit, an oxidizing flow is passed through the cathode side of the fuel cell while a fuel flow is passed through the fuel side of the fuel cell.

An exemplary SOFC fuel is shown in U.S. Published Patent Application No. 2007/0196704, which is hereby incorporated by reference in its entirety. These fuel cell systems generally include a large number of cells assembled into one or more fuel cell stacks in order to achieve the required power levels for a stationary power generation application. Fuel cell stacks are then stacked together to form a column of fuel cell stacks. Fuel manifolds are occasionally inserted between fuel cell stacks to direct a fuel inlet into corresponding adjacent fuel cell stacks and collect fuel exhaust after the fuel reacts in the stacks. A planar SOFC design has traditionally relied on high-temperature gas-tight face seals between a fuel cell stack and another adjacent fuel cell component, such as another fuel cell stack or a fuel manifold. Large compressive loads on the stacks make the face seals as tight as possible.

However, the face seal that connects a stack to an adjacent fuel cell component is frequently not as strong as desired. Small deformations in a column of fuel cell stacks can open the face seals and create significant leakage and force a shut down of the fuel cell system. This weakness is exacerbated in high temperature fuel cell units because of the large pressure drop between the fuel and air stream in and around a fuel cell stack.

SUMMARY

One embodiment of the invention relates to a fuel cell system comprising a first fuel cell stack having a first end plate, wherein the first end plate has a first opening, and a fuel cell component having a second opening. An adapter connects the first opening in the first end plate and the second opening in the fuel cell component. More than one sealing surface exists between the adapter and the first end plate, and more than one sealing surface exists between the adapter and the fuel cell component.

Another embodiment of the invention relates to a fuel cell system comprising a first fuel cell stack having a first end plate, wherein the first end plate has a first opening, and a fuel cell component having a second opening. An adapter connects the first opening in the first end plate and the second opening in the fuel cell component. The adapter comprises a hollow tube. At least one of the first and second openings is located in a first groove. At least a first portion of the adapter is located in the first groove such that there is a passage from the first opening to the second opening through an interior of the hollow tube.

Another embodiment of the invention relates to a fuel cell system comprising a first fuel cell stack having a first end plate, wherein the first end plate has a first opening, a fuel cell component having a second opening, and an adapter connects the first opening in the first end plate and the second opening in the fuel cell component. The adapter comprises a hollow tube and a protrusion located at least partially circumferentially along an exterior of the hollow tube. At least one of the first and second openings is located in a first groove. At least a first portion of the protrusion is located in the first groove such that there is a passage from the first opening to the second opening through an interior of the hollow tube.

Another embodiment of the invention relates to a fuel cell system comprising a first fuel cell stack having a first end plate, wherein the first end plate has a first opening, a fuel cell component having a second opening, and an adapter connecting the first opening in the first end plate and the second opening in the fuel cell component. The adapter comprises a portion of one of the first end plate and the fuel cell component, and more than one sealing surface exists between the adapter and the other one of the first end plate and the fuel cell component.

DETAILED DESCRIPTION OF THE PREFERRED EMBODIMENTS

Figure 1:
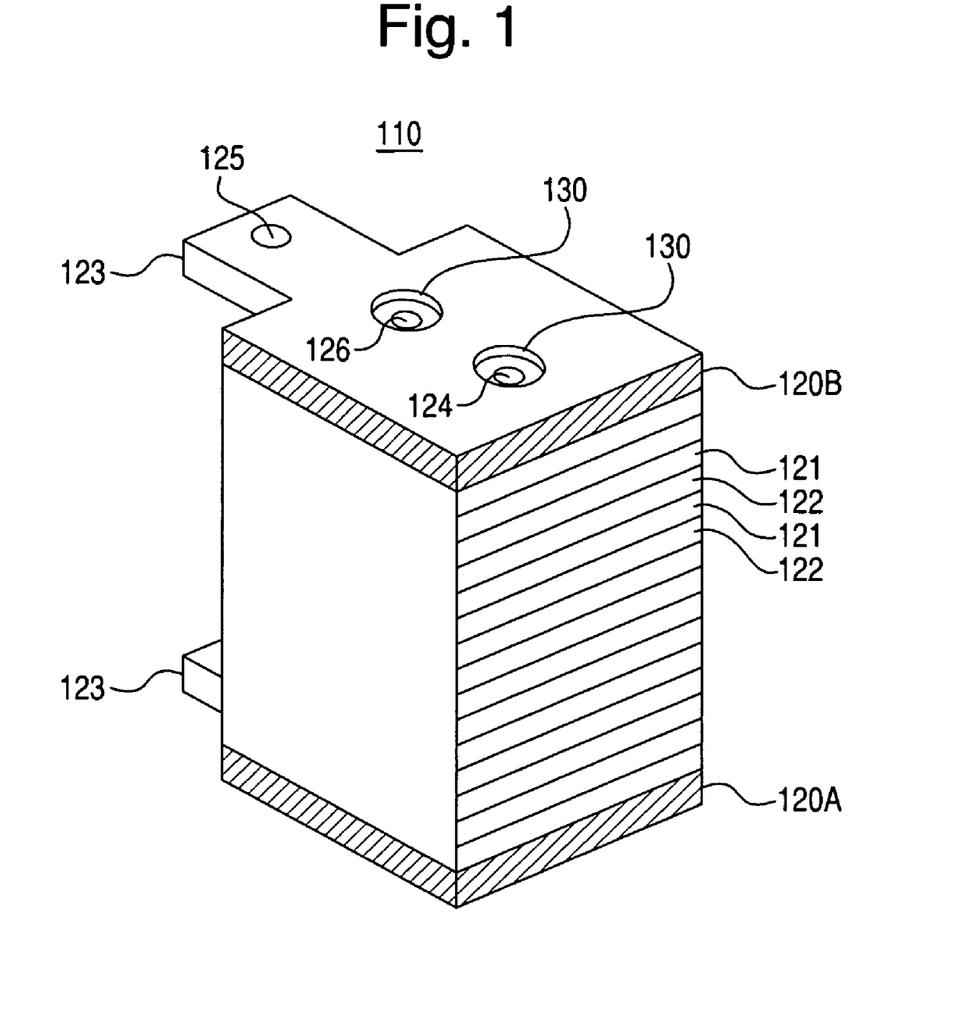
FIG. 1 is a perspective view of a fuel cell stack.

Referring to FIG. 1, a fuel cell stack 110 includes multiple individual planar SOFC cells 122 stacked in electrical series. Other fuel cell types, such as molten carbonate cells, may also be used instead. Respective electrically conductive interconnect plates (also know as gas separator plates) 121 are located between adjacent cells 122. The number of cells required for each stack varies and is typically between twenty-five and one hundred cells 122. For stacks that are internally manifolded for fuel and externally manifolded for air, each cell 122 has a fuel inlet opening and a fuel exhaust opening (also known as fuel inlet and outlet riser openings). If the stack is internally manifolded for air, then each cell may also have air inlet and outlet openings and associated grooves instead of or in addition to fuel inlet and exhaust openings. Each stack 110 preferably has an end plate 120A, 120B at both the top and bottom ends of each stack 110 such that the cells 122 are sandwiched by the end plates 120A 120B. The end plates 120A 120B and each interconnect 121 comprises a conductive material, such as a metal or metal alloy (e.g., a chromium-iron alloy, etc.). Each end plate 120A, 120B may include a tab 123 and bolt opening 125. Each end plate 120A, 120B has a fuel inlet opening 124 that aligns with a corresponding fuel inlet opening 424 in a fuel manifold 489 (shown in FIGS. 6-7) and/or a corresponding fuel inlet opening in an adjacent fuel cell 122. Each end plate 120A, 120B has a fuel exhaust opening 126 that aligns with a corresponding fuel exhaust opening 426 in the fuel manifold 489 and/or a corresponding fuel exhaust opening in an adjacent fuel cell 122. Each end plate 120A 120B also includes grooves 130 in which the fuel inlet opening 124 and the fuel exhaust opening 126 are located. Thus, the openings 124, 126 are located either in a top surface of a groove 130 in an upper stack or component or a bottom surface of a groove in a lower stack or component. These grooves 130 can be made by any suitable machining or metal shaping method well known to those skilled in the art.

Figure 2:
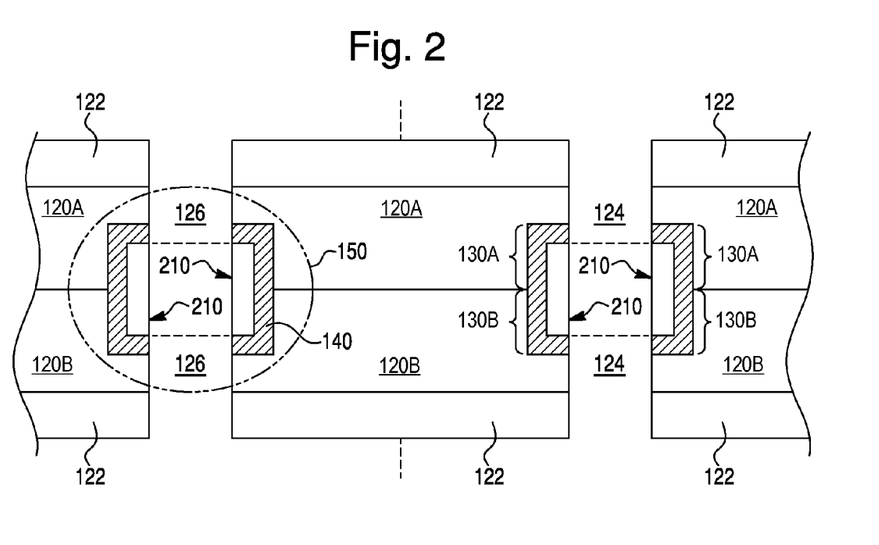
FIG. 2 is a side cross-sectional view of two adjacent fuel cell stacks utilizing a tube-shaped adapter.
Figure 3A:
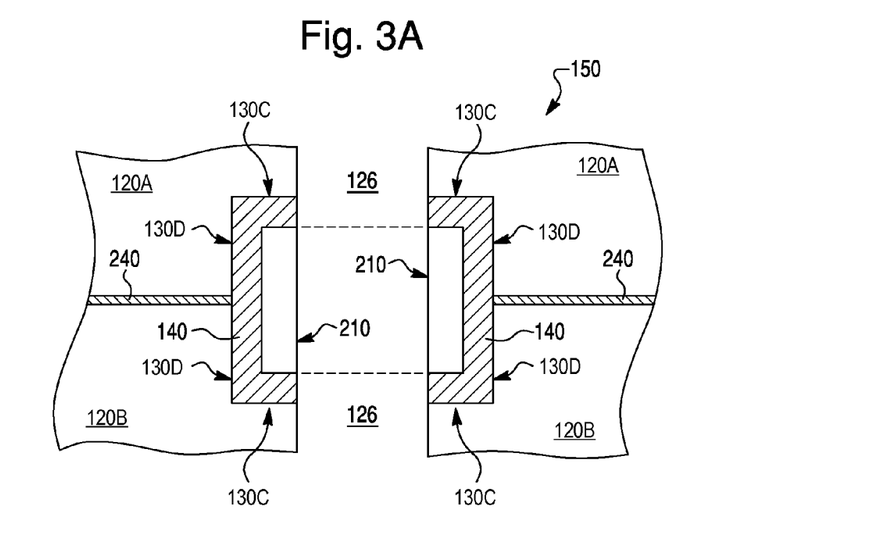
FIG. 3A is a close-up side cross-sectional view of the configuration of a tube-shaped adapter between two fuel cell stacks.
Figure 3B:
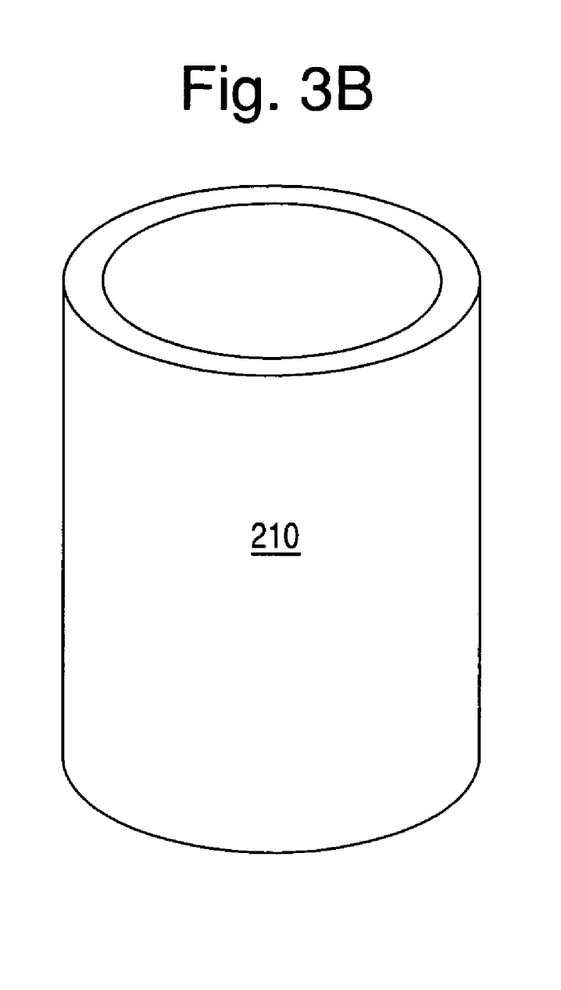
FIG. 3B is a perspective view of the adapter shown in FIGS. 2 and 3A.

FIGS. 2, 3A and 3B show one embodiment of the fuel cell system of the invention. Referring to FIGS. 2 and 3A, the end plate 120A of one stack is adjacent the end plate 120B of another stack. FIG. 3A is a close up of region 150 shown in FIG. 2. The openings 124 and 126 in each adjacent end plate 120A, 120B are aligned. The grooves 130A, 130B in each end plate 120A, 120B should be aligned. An adapter 210 having a hollow tube shape is situated so that the top portion of the adapter 210 connects to groove 130A of the end plate 120A and the bottom portion of the adapter 210 connects to groove 130B of the end plate 120B. As used herein, "tube" and "tube-shaped" are defined as components having a cylindrical or non-cylindrical shape with a circular or non-circular cross-section perpendicular to the longitudinal axis of the component. The adapter 210 is inserted between adjacent stacks 110, as shown in FIGS. 2 and 3A, or between a stack 110 and another adjacent fuel cell component, such as the fuel manifold 489. Planar sealing surfaces ordinarily exist between the portions of adjacent stack end plates 120A and 120B directly contacting each other. The adapter 210 may thus increase the number of sealing surface(s) and ruggedize against inadvertent separation of the planar seal surfaces. As used herein, the term "surface(s)" means a single longitudinal or latitudinal surface of a cylindrical component or one or more longitudinal or latitudinal surfaces of a component having a polygonal cross section. As used herein, a "sealing surface" includes a surface of a stack end plate or other fuel cell component sealed either to an adapter or a surface of an adjacent stack end plate or other fuel cell component. Additionally, if a sealing material is used, a "sealing surface" may also include the portions of the sealing material used to seal an adapter to a stack end plate or other fuel cell component. In addition to providing additional sealing surfaces, the adapter 210 can provide an electrical current path between adjacent fuel cell components. However, sufficient metal to metal contact and interface layer (typically metal oxide) conductivity have to be assured.

The outer width (e.g., diameter for cylindrical adapters) of the adapter 210 should be larger than the width (e.g., diameter) of the openings 124 and 126 in either end plate 120A or 120B and less than the width (e.g., diameter) of the grooves 130. This outer diameter of the adapter 210 is preferably between 8 and 10 mm. The inner width (e.g., diameter) of the adapter 210 is preferably equal to or greater than the width of the openings 124 and 126 and differs from the outer width by the thickness of the wall(s) of the adapter. The thickness of the walls(s) may be 0.2-1 mm, such as 0.3-0.5 mm. The height of the adapter 210 is preferably between 4-5 mm. The depth of the grooves 130 is preferably between 2-3 mm, and the diameter of the grooves is preferably between 10-12 mm. This placement ensures that the adapter 210 is retained in its position and does not slip into one of the openings 124 or 126 in either end plate 120A or 120B. If the height of the adapter 210 is less than the distance between the groove surfaces 130C in adjacent end plates 120A and 120B, a sealing material 140 may be used to connect the adapter 210 to the grove surfaces 130C.

As used herein, the longitudinal direction is the direction in which cells 122 are stacked and the latitudinal direction is perpendicular to this stacking direction. As can be seen most clearly in FIG. 3, each groove 130 has two surfaces: a latitudinal surface 130C and a longitudinal surface 130D. These multiple surfaces 130C and 130D of each groove 130A, 130B allows adapter 210 to be sealed to multiple surfaces of each end plate 120A and 120B. Thus, a seal 140 can exist between: (1) the top portion of the adapter 210 and the latitudinal surface(s) 130C of groove 130A in end plate 120A; (2) the side portions of adapter 210 and the longitudinal surface(s) 130D of groove 130A in end plate 120A; (3) the side portions of adapter 210 and the longitudinal surface(s) 130D of groove 130B in end plate 120B; and (4) the bottom portion of adapter 210 and the latitudinal surface(s) 130C of groove 130B in end plate 120B.

The adapter 210 is shown in FIGS. 2, 3A and 3B as a hollow cylinder with a circular latitudinal cross sectional shape. However, it should be understood that the adapter 210 may have a different shape, such as a latitudinal cross sectional shape of hollow rectangle, square, polygon, oval, or any other shape that provides multiple sealing surfaces. Thus, the grooves 130A or 130B can be shaped to accommodate any of these differently shaped adapters 210.

The adapter 210 is preferably made of a high temperature grade metal or alloy because of the high operating temperatures of the fuel cell system. Inconel 600 or similar super alloys can be used. However, softer and less creep-resistant materials may be suitable.

The optional seal 140 between the adapter 210 and the various groove 130 surfaces can be formed according to any suitable sealing method, such as dip coating, etc. An optional sealing material 240 may also be located between mating surfaces of components 120A and 120B as shown in FIG. 3A. A glass, glass ceramic, or soft metal (e.g., metal felt or foam) sealing material 140 can be used between the adapter 210 and the various groove 130 surfaces. For example, aluminosilicate glass sealing material can be applied via dip coating or any other suitable application method. If a sealing material is used, then the adapter 210 may also be made of non-metallic materials, such as ceramic. An alternative sealing material comprises a grown oxide layer on the exterior of the adapter 210 which can be formed by oxidizing a metal or metal alloy adapter after the adapter has been placed between the two end plates 120A and 120B such that the layer would conform to the adjacent groove 130 surfaces. Additionally, sealing methods that do not involve using a sealing material or layer can also be used. Tight-fitting or press-fitting between the outer surfaces of the adapter 210 to the groove 130 surfaces may be sufficient to seal the adapter 210 to the adjacent end plates 120. Thermal expansion mismatch of the adapter 210 relative to the adjacent end plates 120 may be utilized by choosing a material for the adapter 210 that has a different (i.e., preferably larger) coefficient of thermal expansion relative to the material of the end plates 120. As the temperature of the fuel cell system increases during operation, the adapter 210 may expand relative to the adjacent end plates 120 so that the gap between the adapter 210 and adjacent end plates 120 decreases. Finally, if desired, the adapter may be bolted or clipped to at least one end plate.

Figure 4:
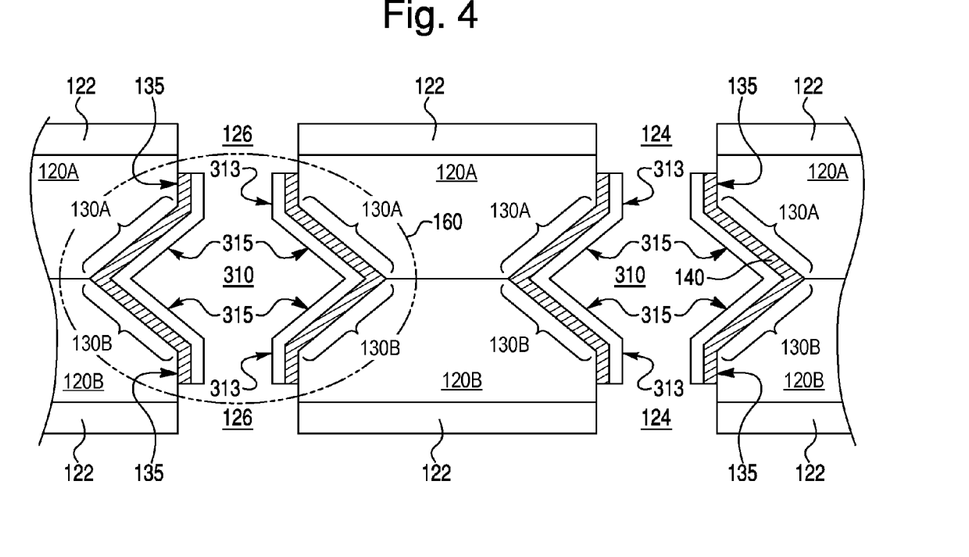
FIG. 4 is a side cross-sectional view of two connecting fuel cell stacks utilizing an adapter having a tube and a protrusion.
Figure 5A:
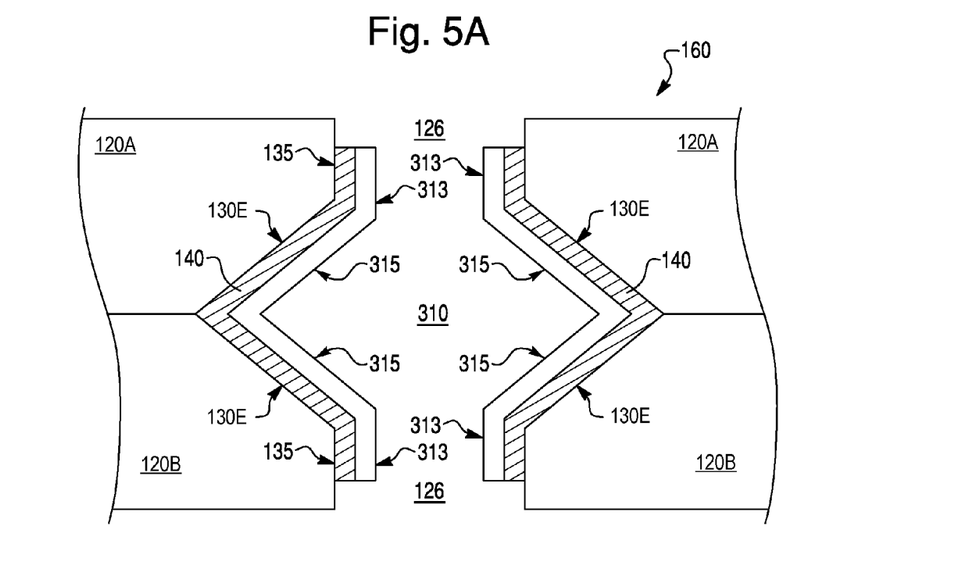
FIG. 5A is a close-up side cross sectional view of the configuration of the adapter between two fuel cell stacks of FIG. 4.

FIGS. 4 and 5A-C show another embodiment of the fuel cell system of the invention. Referring to FIGS. 4 and 5A, the end plate 120A of one stack is adjacent the end plate 120B of another stack. FIG. 5 is a close up view of the region 160 in FIG. 4. The openings 124 and 126 in each adjacent end plate 120A, 120B are aligned. The grooves 130A, 130B in each end plate 120 should also be aligned. The adapter 310 has a shape of a hollow tube 313 situated so that the top portion of the tube 313 contacts the side walls 135 of openings 124 and 126 of the end plate 120A and the bottom portion of the tube 313 contacts the side walls 135 of openings 124 and 126 of the end plate 120B. The adapter 310 also includes a protrusion 315 that is located at least partially circumferentially around the outer wall of the tube 313 such that the protrusion 315 is securely connected to the tube 313. The protrusion 315 should be situated so that the top portion of the protrusion 315 rests in groove 130A of the end plate 120A and the bottom portion of the protrusion 315 rests in groove 130B of the end plate 120B. The outer width (e.g., diameter) of the protrusion 315 should be larger than the width (e.g., diameter) of the openings 124 and 126 and less than the width (e.g., diameter) of the grooves 130 in end plates 120A and 120B. This outer diameter is preferably between 8-10 mm, such as about 9 mm. The inner and outer diameter of the tube 313 is preferably less than the diameter of the openings 124 and 126 to allow the tube to fit into the openings. Thus, the outer diameter of the tube 313 is preferably between 6-8 mm and the inner diameter is about 0.2 to 0.5 mm less than that. The height of the tube 313 is preferably between 4-5 mm. The height of the protrusion 315 is preferably 0.2-0.5 mm. The depth of the grooves 130 is preferably 0.2-0.5 mm, and the width (e.g., diameter) of the grooves 130 is preferably 10-12 mm. This placement of the protrusion 315 ensures that the adapter 310 is retained in its position and does not slip into one of the openings 124 or 126 in end plates 120A and 120B.

As can be seen most clearly in FIG. 5A, grooves 130A and 130B have groove surfaces 130E. These groove surfaces 130E of each groove 130 allow adapter 310 with protrusion 315 to be sealed to multiple surfaces of each end plate 120A and 120B. Thus, a seal 140 can exist between: (1) the top portion of the tube 313 and the side wall surface(s) 135 of end plate 120A; (2) the top portion of the protrusion 315 and the groove surface(s) 130E in end plate 120A; (3) the bottom portion of protrusion 315 and the groove surface(s) 130E in end plate 120B; and/or (4) the bottom portion of the tube 313 and the side wall(s) 135 of end plate 120B. The seal 140 may be omitted in locations (1) and/or (4) if it is not desired to introduce a sealing material into the fuel inlet and outlet openings.

Figure 5B:
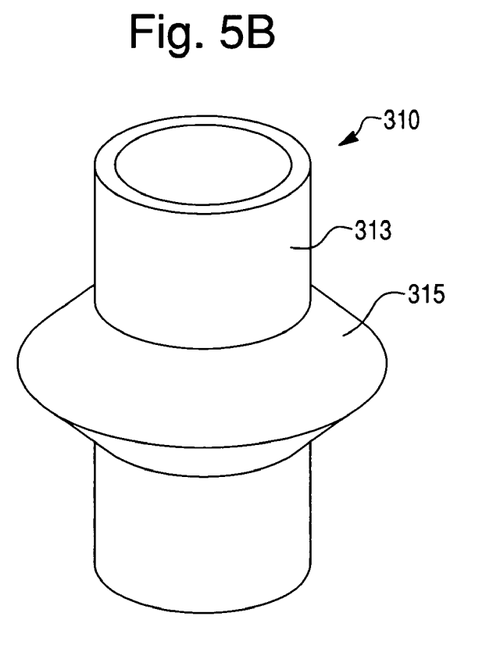
FIG. 5B is a perspective view of the adapter shown in FIGS. 4 and 5A.
Figure 5C:
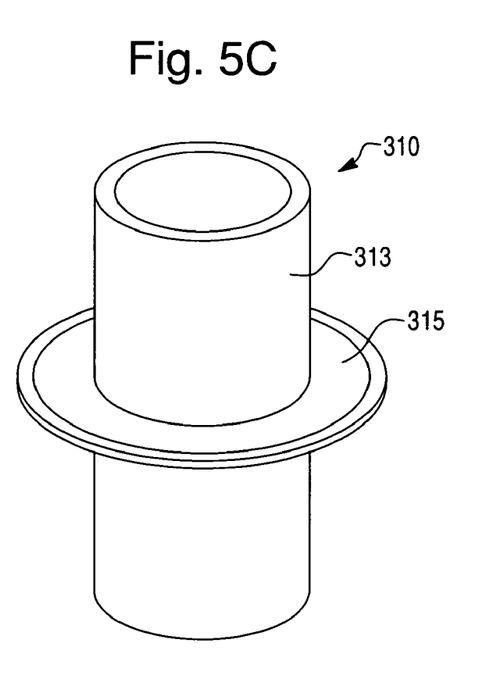
FIG. 5C is a perspective view of an alternative adapter having a cylinder-shaped protrusion.

The tube 313 is shown in FIGS. 4 and 5A as a hollow cylinder. However, it should be understood that the tube 313 may have a different shape, such as a cross sectional shape of rectangle, square, polygon, oval, or any other shape that provides multiple sealing surfaces. The tube 313 is shown as hollow to allow for continuous flow through the feed and exhaust openings in the end plates 120A and 120B and cells 122. The protrusion 315 is shown in FIGS. 5A and 5B as having roughly triangular shape so that it conforms to slanted groove surfaces 130E of grooves 130 formed in the end plates 120A and 120B. However, it should be understood that the protrusion can have a different shape, such as a rectangular, square, polygon, oval, or any other shape that provides multiple sealing surfaces and conforms to the shape of grooves 130. An adapter 310 having a cylinder shaped protrusion 315 is shown in FIG. 5C.

The protrusion 315 can be formed in multiple ways. The protrusion 315 can simply be made by deforming the wall of the adapter 310 to conform to the shape of the grooves 130, as shown in FIG. 5B. The protrusion can also be made by connecting a separate at least partially circumferential piece 315 to the tube 313 portion of the adapter 310, as shown in FIG. 5C.

The seal between the tube 313 and the side walls 135 of the openings 124, 126 and between the protrusion 315 and the groove surfaces 130E can be made according to the description above of the seal between the adapter 210 and the various groove 130 surfaces.

Figure 6:
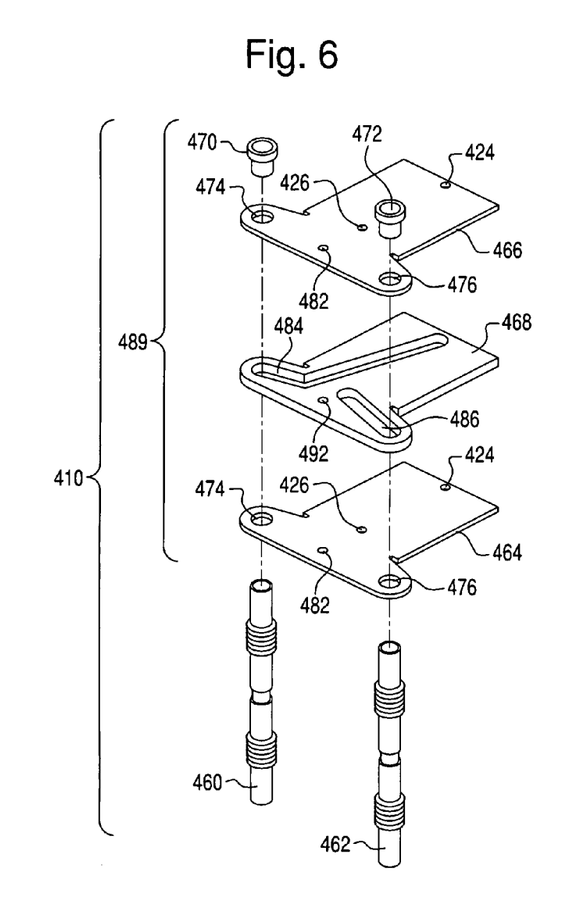
FIG. 6 is a perspective view of a disassembled fuel manifold assembly.
Figure 7:
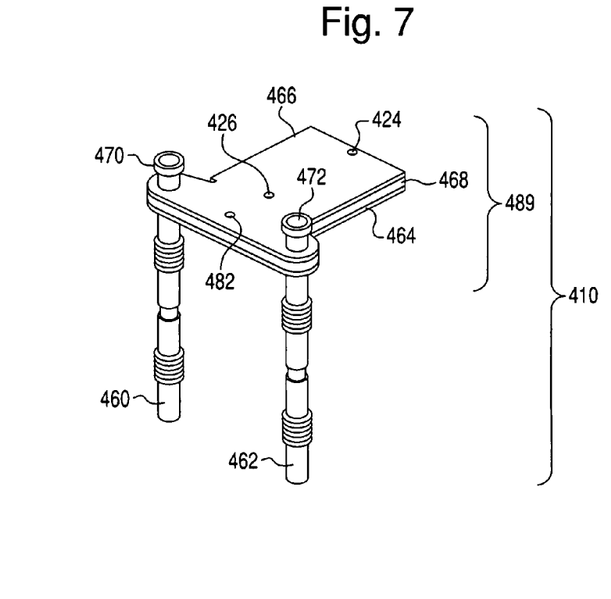
FIG. 7 is a perspective view of an assembled fuel manifold assembly.

While a connection between two stacks was shown in FIGS. 2 to 5, a stack may be connected to another component, such as a fuel manifold. For example, a fuel manifold described in U.S. Published Applications Nos. 2006/0204827 and 2007/0196704, both incorporated herein by reference in their entirety, may be used. Referring to FIGS. 6 and 7, an exemplary fuel manifold assembly 410 includes a fuel inlet tube 460, a fuel exhaust tube 462, a pair of cover plates 464 and 466, an intermediate plate 468, and a pair of fluid connections 470 and 472. The plates 464 and 466 are identical and each plate 464 and 466 includes a feed port 474, an exhaust port 476, a feed opening 424, an exhaust opening 426, and a clearance hole 482. The intermediate plate 468 includes a clearance hole 492, a feed slot 484 and an exhaust slot 486. In the assembled state, the plates 464, 466 and 468 form a splitter fuel manifold 489 and the feed slot 484 directs a fuel inlet to the opening 424 for delivery to the stacks 110 positioned above and below the manifold 489, while the exhaust slot 486 receives fuel exhaust from the stacks 110 positioned above and below the manifold 489. The fluid connections 470 and 472 either serve to connect the manifold assembly 410 to the next fuel splitter assembly or, for the topmost splitter assembly, are provided in the form of end caps. The clearance holes 482 and 492 provide clearance for a bolt that is used to maintain alignment between the stacks 110 adjacent the manifold 489.

Thus, adapter 210, 310 as shown in FIGS. 2-5 can be used to connect a stack 110 to a fuel manifold assembly 410. The features described in the connection between two stacks 110 shown in FIGS. 2-5 are equally applicable to the connection between a stack 110 and a fuel manifold assembly 410. Furthermore, while two mating grooves 130A, 130B are shown in FIGS. 2 and 4, it should be understood that only one groove may be used between two mating components. In other words, the end plate 120A may contain groove 130A which contains opening 124 or 126 in its upper surface. However, the mating end plate 120B or manifold 489 may lack a groove 130B and the opening 124 or 126 extends directly from the upper surface of end plate 120B or manifold 489. Likewise, a groove 130B may be located in the bottom component (120B or 489) but not in the top component 120A. In configurations with only one groove between two mating components, the entire adapter 210 shown in FIGS. 3A and 3B may be located in the single groove. Likewise, in configurations with only one groove between two mating components, the entire protrusion 315 of adapter 310 shown in FIGS. 4A, 4B and 4C may be located in the single groove, while top and bottom parts of the tube portion 313 of the adapter 310 may be located in a respective opening in the top and bottom component.

Figure 8:
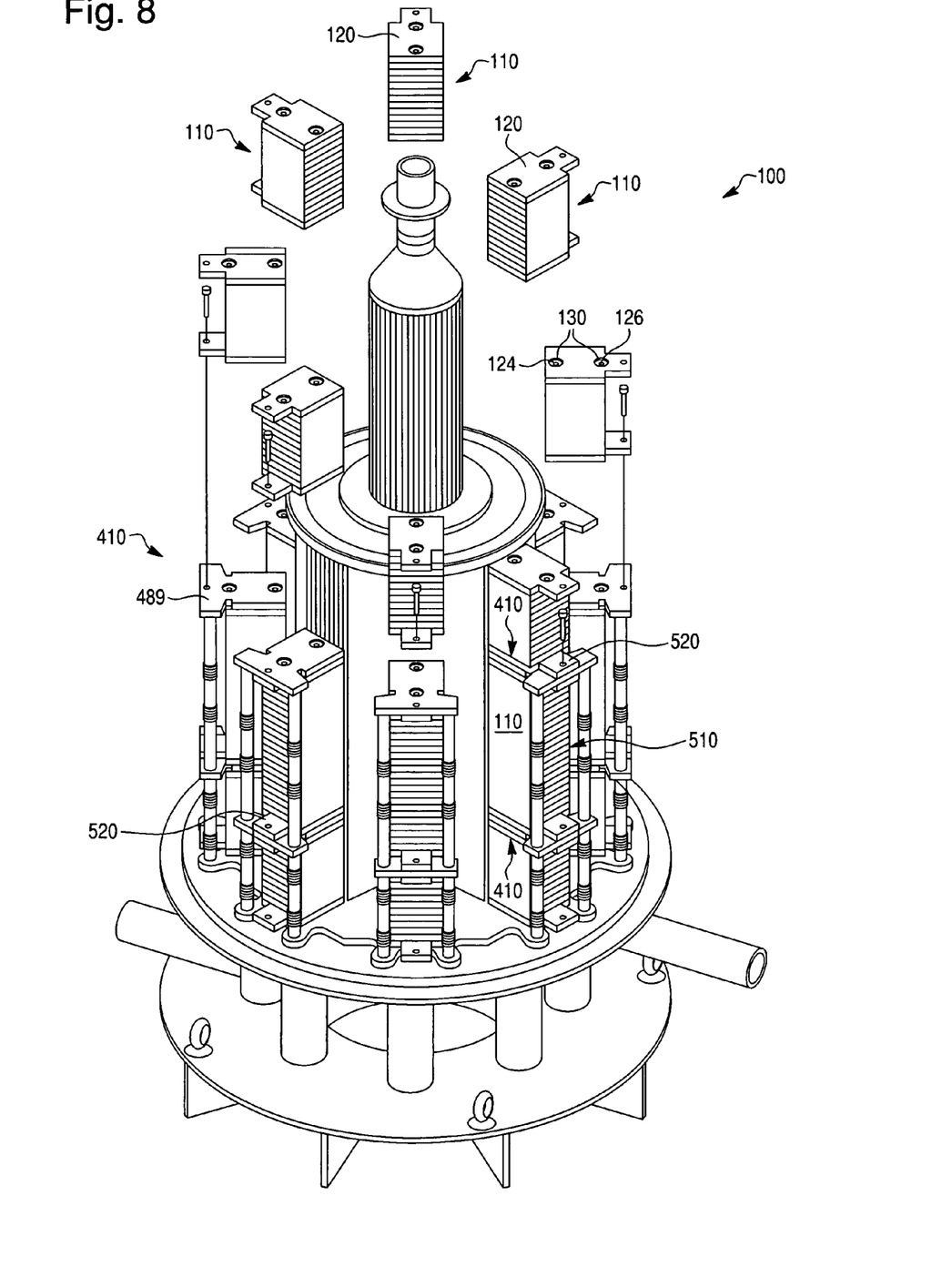
FIG. 8 is a perspective view of a partially integrated fuel cell system having fuel cell stacks and fuel manifolds stacked together.

FIG. 8 shows a partially integrated fuel cell system 100 described in U.S. Published Application No. 2007/0196704 showing how stacks 110 with end plates 120 are connected to each other and to fuel manifolds 410 used the adapters described herein. Stack-to-stack connection 510 is shown, as well as stack-to-fuel manifold connection 520.

Figure 9:
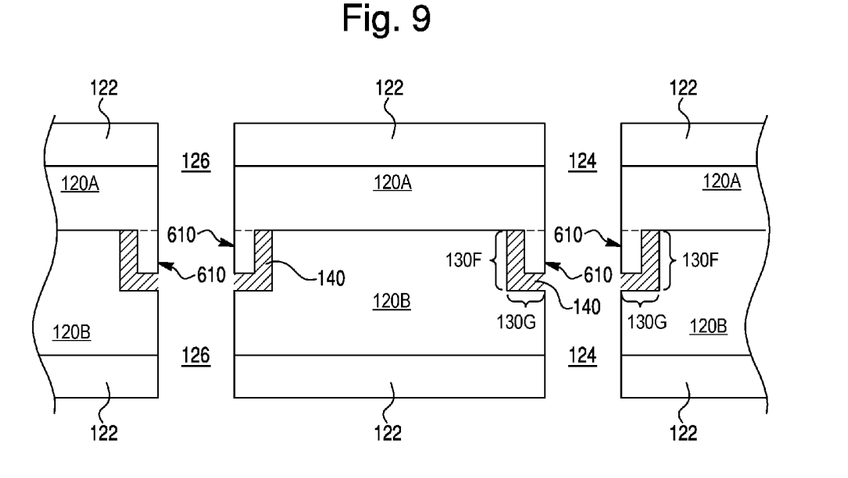
FIG. 9 is a side cross-sectional view of two adjacent fuel cell stacks utilizing a tube-shaped adapter according to another exemplary embodiment.

In the previous embodiments, the adapter was illustrated as a component which is separate from the end plate(s) or the manifold, and which fits at least partially into one or more grooves in the end plate(s) or the manifold. FIG. 9 shows another embodiment of the fuel cell system of the invention in which the adapter comprises a portion of an end plate or a manifold. In this embodiment, the adapter fits into a groove in the opposing end plate or manifold. The end plate 120A of one stack is adjacent to the end plate 120B of another stack. The respective openings 124 and 126 in each adjacent end plate 120A, 120B are aligned. An adapter 610 having a hollow tube shape is located so that a top portion of the adapter 610 comprises a part of the end plate 120A and a bottom portion of the adapter 610 is located in the groove 130 (i.e., connected to groove surfaces 130F and 130G) of the end plate 120B by sealing material 140. For metal parts, such as end plates or manifold plates, formed by casting, powder metallurgy, forging, pressing, etc., the adapter may be formed during the metal part formation step. Alternatively, the adapter may be welded to the end plate or manifold plate.

Alternatively, the adapter 610 may be located so that a bottom portion of the adapter 610 comprises a part of the end plate 120B and a top portion of the adapter 610 is connected to groove surfaces of grooves made in end plate 120A. The adapter 610 may also have a shape other than that shown in FIG. 9, such as a shape similar to that of adapter 310 shown in FIG. 4. Finally, the adapter 610 may comprise a part of a manifold plate and/or contain a portion which is located in a groove in a manifold plate, as shown in FIG. 7. The adapter 610 can have a rectangular, square, polygonal, oval, or any other shape that provides multiple sealing surfaces and conforms to the shape of grooves 130 in an adjacent end plate or manifold plate.

The invention provides numerous advantages over the prior art. Because the adapter provides a strong connection between a stack and an adjacent fuel cell component than, there is increased reliability in the operation of the fuel cell system. Preventing leaks increases the operating life of a fuel cell system assembly and generally increases system performance.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A fuel cell system, comprising:
a first fuel cell stack having a first end plate, wherein the first end plate has a first opening;
a fuel cell component having a second opening; and
an adapter connecting the first opening in the first end plate and the second opening in the fuel cell component, wherein:
more than one sealing surface exists between the adapter and the first end plate; and
more than one sealing surface exists between the adapter and the fuel cell component;
wherein the fuel cell component is a second end plate of a second fuel cell stack or a fuel manifold.

2. The fuel cell system of claim 1, wherein the adapter comprises a hollow tube.

3. A fuel cell system comprising:
a first fuel cell stack having a first end plate, wherein the first end plate has a first opening;
a fuel cell component having a second opening; and
an adapter connecting the first opening in the first end plate and the second opening in the fuel cell component, wherein:
more than one sealing surface exists between the adapter and the first end plate; and
more than one sealing surface exists between the adapter and the fuel cell component,
wherein the adapter is sealed to the first end plate and fuel cell component by a seal comprising the more than one sealing surface of the first end plate and by the seal comprising the more than one sealing surface of the fuel cell component.

4. The fuel cell system of claim 3, wherein the fuel cell component is a second end plate of a second fuel cell stack or a fuel manifold.

5. A fuel cell system comprising:
a first fuel cell stack having a first end plate, wherein the first end plate has a first opening;
a fuel cell component having a second opening; and
an adapter connecting the first opening in the first end plate and the second opening in the fuel cell component, wherein:
more than one sealing surface exists between the adapter and the first end plate; and
more than one sealing surface exists between the adapter and the fuel cell component,
wherein the adapter comprises a hollow tube, and
wherein the adapter further comprises a protrusion which is located in at least one groove in the first end plate or in the fuel cell component and the tube extends into the first and into the second opening.

6. A fuel cell system comprising:
a first fuel cell stack having a first end plate, wherein the first end plate has a first opening;
a fuel cell component having a second opening; and
an adapter connecting the first opening in the first end plate and the second opening in the fuel cell component, wherein:
more than one sealing surface exists between the adapter and the first end plate; and
more than one sealing surface exists between the adapter and the fuel cell component;
wherein the adapter comprises a hollow tube,
and wherein:
the adapter is located in:
(i) at least one groove in the first end plate or in the fuel cell component; or
(ii) in mating first groove in the first end plate and second groove in the fuel cell component; and
the tube does not extend into the first and into the second opening.

7. A fuel cell system, comprising:
a first fuel cell stack having a first end plate, wherein the first end plate has a first opening;
a fuel cell component having a second opening; and
an adapter connecting the first opening in the first end plate and the second opening in the fuel cell component, wherein:
the adapter comprises a hollow tube;
at least one of the first and the second openings is located in a first groove; and at least a first portion of the adapter is located in the first groove such that there is a passage from the first opening to the second opening through an interior of the hollow tube; wherein:
the first opening is located in the first groove in the first end plate and the second opening is located in a second groove in the fuel cell component, such that a second portion of the adapter is located in the second groove;
more than one sealing surface exists between the first portion of the adapter and the first end plate; and
more than one sealing surface exists between a second portion of the adapter and the fuel cell component.

8. The fuel cell system of claim 7, wherein:
the adapter is located entirely in the first groove or the first and the second grooves;
the tube does not extend into the first opening and into the second opening; and
an outer diameter of the hollow tube is greater than a diameter of the first and second openings.

9. The fuel cell system of claim 7, wherein:
the adapter is sealed to the first end plate and the fuel cell component by a sealing material or by tight or press fitting; and
the fuel cell component is a second end plate of a second fuel cell stack or a fuel manifold.

10. A fuel cell system comprising:
a first fuel cell stack having a first end plate, wherein the first end plate has a first opening;
a fuel cell component having a second opening; and
an adapter connecting the first opening in the first end plate and the second opening in the fuel cell component, wherein:
the adapter comprises a hollow tube;
at least one of the first and the second openings is located in a first groove; and
at least a first portion of the adapter is located in the first groove such that there is a passage from the first opening to the second opening through an interior of the hollow tube;
wherein the hollow tube has a circular, rectangular, square, polygonal, or oval cross sectional shape, and a longitudinal axis of the hollow tube is in a stacking direction of the fuel cells in the fuel cell stack.

11. A fuel cell system comprising:
a first fuel cell stack having a first end plate, wherein the first end plate has a first opening;
a fuel cell component having a second opening; and
an adapter connecting the first opening in the first end plate and the second opening in the fuel cell component, wherein:
the adapter comprises a hollow tube;
at least one of the first and the second openings is located in a first groove; and
at least a first portion of the adapter is located in the first groove such that there is a passage from the first opening to the second opening through an interior of the hollow tube;
wherein at least a first portion of the adapter comprises a protrusion which is located at least partially around the tube and the tube extends into the first opening and into the second opening.

12. A fuel cell system comprising:
a first fuel cell stack having a first end plate, wherein the first end plate has a first opening;
a fuel cell component having a second opening; and
an adapter connecting the first opening in the first end plate and the second opening in the fuel cell component, wherein:
the adapter comprises a hollow tube;
at least one of the first and the second openings is located in a first groove; and
at least a first portion of the adapter is located in the first groove such that there is a passage from the first opening to the second opening through an interior of the hollow tube;
wherein the first opening comprises a fuel inlet opening and the second opening comprises a fuel outlet opening.

13. A fuel cell system, comprising:
a first fuel cell stack having a first end plate, wherein the first end plate has a first opening;
a fuel cell component having a second opening; and
an adapter connecting the first opening in the first end plate and the second opening in the fuel cell component, wherein:
the adapter comprises a hollow tube and a protrusion located at least partially circumferentially along an exterior of the hollow tube;
at least one of the first and the second openings is located in a first groove;
at least a first portion of the protrusion is located in the first groove such that there is a passage from the first opening to the second opening through an interior of the hollow tube.

14. The fuel cell system of claim 13, wherein:
the first opening is located in the first groove in the first end plate and the second opening is located in a second groove in the component such that a second portion of the protrusion is located in the second groove;
more than one sealing surface exists between the first portion of the protrusion and the first end plate; and
more than one sealing surface exists between a second portion of the protrusion and the fuel cell component.

15. The fuel cell system of claim 14, wherein:
the protrusion is located entirely in the first and the second grooves;
the tube extends into the first opening and into the second opening; and
an outer diameter of the protrusion is greater than a diameter of the first and second openings.

16. The fuel cell system of claim 14, wherein:
the adapter is sealed to first end plate and the fuel cell component by a sealing material or by tight or press fitting; and
the fuel cell component is a second end plate of a second fuel cell stack or a fuel manifold.

17. The fuel cell system of claim 13, wherein the hollow tube has a circular, rectangular, square, polygonal, or oval cross sectional shape, and a longitudinal axis of the hollow tube is in a stacking direction of the fuel cells in the fuel cell stack.

18. The fuel cell system of claim 13, wherein the first opening comprises a fuel inlet opening and the second opening comprises a fuel outlet opening.

19. The fuel cell system of claim 13, wherein the protrusion comprises a deformed portion of a wall of the tube or the protrusion is attached to the tube.

* * * * *